(12) United States Patent
Plamondon

(10) Patent No.: US 8,634,765 B2
(45) Date of Patent: Jan. 21, 2014

(54) PORTABLE SATELLITE DATA COMMUNICATION DEVICE AND RELATED METHOD

(75) Inventor: Gerald Plamondon, Montreal (CA)

(73) Assignee: Gerald Plamondon, Montreal (CA)

( * ) Notice: Subject to any disclaimer, the term of this patent is extended or adjusted under 35 U.S.C. 154(b) by 616 days.

(21) Appl. No.: 12/901,126

(22) Filed: Oct. 8, 2010

(65) Prior Publication Data

US 2011/0092158 A1    Apr. 21, 2011

Related U.S. Application Data

(60) Provisional application No. 61/249,821, filed on Oct. 8, 2009.

(51) Int. Cl.
*H04B 3/36* (2006.01)
*H04B 7/14* (2006.01)

(52) U.S. Cl.
USPC .............................. 455/7; 455/41.2; 455/12.1

(58) Field of Classification Search
USPC .......................... 455/12.1, 41.2, 41.3, 7, 3.05
See application file for complete search history.

(56) References Cited

U.S. PATENT DOCUMENTS

| | | | | |
|---|---|---|---|---|
| 4,642,806 A | * | 2/1987 | Hewitt et al. | 370/347 |
| 5,588,038 A | * | 12/1996 | Snyder | 340/7.1 |
| 6,043,918 A | * | 3/2000 | Bozzay et al. | 398/121 |
| 6,134,437 A | * | 10/2000 | Karabinis et al. | 455/427 |
| 6,714,797 B1 | * | 3/2004 | Rautila | 455/552.1 |
| 7,027,773 B1 | * | 4/2006 | McMillin | 455/41.2 |
| 8,064,551 B2 | * | 11/2011 | Skiscim et al. | 375/343 |
| 2006/0010480 A1 | * | 1/2006 | Gaumond et al. | 725/134 |
| 2006/0140208 A1 | * | 6/2006 | Couch et al. | 370/445 |
| 2006/0217121 A1 | * | 9/2006 | Soliman et al. | 455/446 |
| 2006/0242127 A1 | * | 10/2006 | Boone et al. | 707/3 |
| 2007/0142053 A1 | * | 6/2007 | Soliman et al. | 455/446 |
| 2008/0132167 A1 | * | 6/2008 | Bent et al. | 455/41.2 |
| 2008/0167031 A1 | * | 7/2008 | Sorber et al. | 455/426.1 |
| 2012/0051405 A1 | * | 3/2012 | Piesinger | 375/211 |

\* cited by examiner

*Primary Examiner* — Lewis West

(57) ABSTRACT

A portable satellite data communication device that provides data communication capabilities to cellular only smartphone and similar device globally. The portable satellite data communication device is equipped with a short range wireless transceiver such as Bluetooth for communication with the smartphone and a satellite data transceiver for communication with the satellite. The device acts as network bridge between the smartphone and the satellite network. Using that device allows smartphone users to keep sending and receiving data messages like emails anywhere in the world even if there is no cellular coverage. The portable satellite data communication device also has built-in functionalities for monitoring the satellite signal and the arrival of new messages at the satellite gateway.

20 Claims, 7 Drawing Sheets

PORTABLE SATELLITE DATA COMMUNICATION DEVICE AND RELATED METHOD

CROSS-REFERENCE TO RELATED APPLICATIONS

This application claims the benefit of PPA 61/249,821 filed on Oct. 8, 2009 by the present inventor, which is incorporated by reference.

BACKGROUND

1. Field of the Invention

The present invention relates generally to apparatus and methods for the transmission of data messages through satellites in remote areas.

2. Discussion of Prior Art

Earlier cellular phones functionalities were limited to voice calls and SMS messaging. Nowadays, new devices like the Smartphone are available. A smartphone is a mobile phone offering advanced capabilities, often with PC-like functionality. Apart from making phones calls, Smartphones are used for sending and receiving emails and text message (SMS). They are also used for Internet Web browsing, GPS tracking and multiple other functionalities available as Apps. In fact, their PC-like functionality allows software developers to create various applications.

For most Smartphones, network functionalities can only be used however if the device is within a region with cellular coverage. Unless the Smartphone is equipped with an internal Satellite Transceiver, the device is basically useless outside cellular areas.

Because of this limitation, individuals traveling in remote areas where cellular wireless coverage is not available have been mostly using satellite phones as a portable device for communication needs. Other satellite devices are available but are usually considered too bulky or expensive for personal use.

Satellite phones that operates on the Iridium, Globalstar, Inmarsat or Thuraya satellite networks for example share the same operational limits. Satellite phones requires a direct line of sight with satellites for establishing communication. Therefore one must be physically outside and hold or install the phone in particular way to satisfy this requirement. This can be difficult and inconvenient particularly if the weather or the climatic conditions are not favorable.

Since the satellite phones must always have a direct line of sight with the satellite for proper operation, they are mostly used for making calls and not for receiving calls. In fact, circa 2009, receiving calls or SMS messages on an Iridium satellite phone is free of charge for the phone owner. Therefore, trying to call somebody travelling with a satellite phone can be difficult and multiple attempts may be needed. Sending an SMS message to a satellite phone owner may be a better solution if there is an urgent need to contact the individual. But still, the SMS message cannot be delivered if the Satellite phone is not powered up with direct line of sight with the satellite.

Ideally, a Smartphone owner would have the have capability to keep sending and receiving information without having to buy an additional phone (Satellite phone) when they are in a remote area where there is no cellular coverage. Smartphone owners usually keep all their contact information within the smartphone and they send and receive emails using that same device. It is much more practical to keep using that same device for sending and receiving messages instead of relying on another independent device when there is a need for data communication.

A personal locating device described in Published U.S. Patent Application No 2009/0121930 describe a small device that operates globally but it lacks the capability to communicate with an external device like a smartphone and it must held outside with a direct line of sight with the satellite.

A communication system is described in Published U.S. Patent Application No 2005/0055407 but it is not portable and is targeted toward marine applications with integrated GPS and sensors. Moreover it does not interface with a smartphone or similar wireless device.

It would therefore be desirable to have apparatus and methods that cost-effectively provides data communication capability to a smartphone outside cellular network coverage area. It would also be desirable to have apparatus and methods that enables a Smartphone to keep receiving and sending data messages even if the smartphone does not have a direct line of sight with the satellite and finally that apparatus would be small and portable.

BRIEF DESCRIPTION OF THE DRAWINGS

In order to describe the manner in which the advantages and features can be obtained, a more particular description is provided below and will be rendered to specific embodiments thereof, which are illustrated in the appended drawings. Understanding that these drawings depict only typical embodiments and are not therefore to be considered to be limiting of its scope, implementation will be described and explained with additional specificity and detail through the use of the accompanying drawing in which.

GLOSSARY

Data message: In the context of this invention, a series of bytes or characters to be transferred between a computing device like a smartphone and a processing center such as a back office server. A data message may be for example the characters of an email, a GPS position report, an SMS message, a weather update, etc.

Short Burst Data message: A series of bytes or characters encapsulated in a message specially formatted for transmission over a low bandwidth satellite network service.

Satellite short burst data transceiver: A satellite data transceiver optimized for sending and receiving short data messages under approximately 10,000 bytes in burst with low power requirements and requiring only a small compact satellite antenna.

Bluetooth: a short range wireless technology standard for exchanging data over short distances Smartphone: A smartphone is defined as a computing device comprising mobile phone functionality and offering advanced capabilities, often with PC-like functionality. In the context of this invention, the smartphone is portable and equipped with a cellular wireless transceiver and a short range wireless transceiver such as Bluetooth.

DETAILED DESCRIPTION

The present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The apparatus, systems and methods function to provide consumer satellite messaging and low bandwidth data transfer using a smartphone or a similar device such as a laptop computer or the like equipped with a Bluetooth transceiver. That capability can be provided by using a satellite transceiver and the required software and firmware to enable the smartphone to send and receive data using that satellite transceiver instead of the cellular network.

Figure 1:
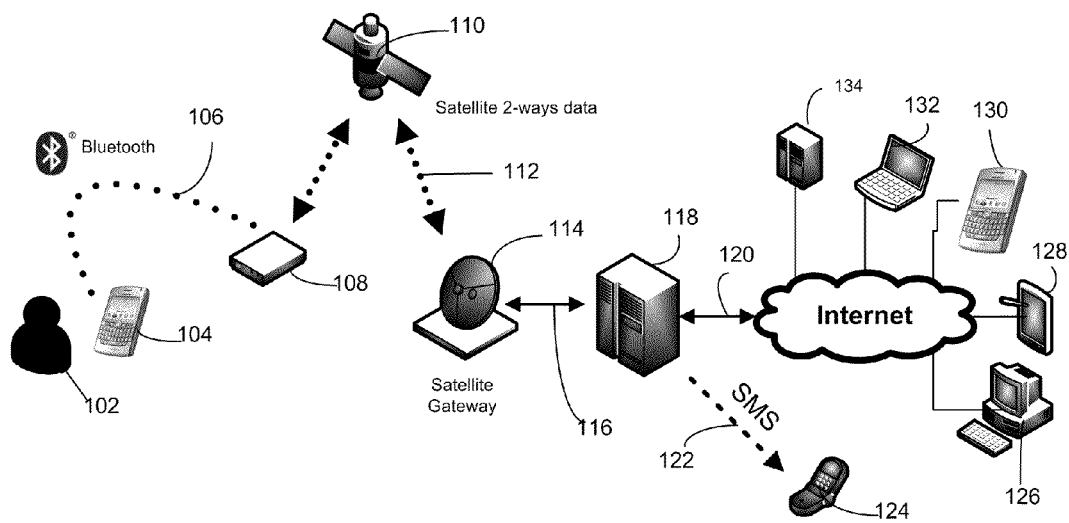
FIG. 1 is a general schematic view of a network configuration in accordance with the invention. It illustrates components of an exemplary satellite data transfer system for cellular only smartphones.

Referring to the drawing figures, FIG. 1 illustrates components of an exemplary satellite data transfer system for cellular only smartphones. A user 102 located in a remote area without cellular coverage has a smartphone such as a BlackBerry 104 loaded with the appropriate communication software sends a data message such as en email. The smartphone 104 establish Bluetooth pairing 106 with the portable satellite data communication unit 108 and convert the data message in a format suitable for transfer over the satellite network 110. Once the Bluetooth pairing is establish between the smartphone and the portable satellite data communication unit 108, the portable satellite data communication unit 108 behave as a slave of the smartphone 104. The smartphone 104 software verify that adequate satellite signal is available and request the portable satellite data communication unit 108 to send the data message using satellite communication 112. A satellite network such as Iridium 110,112,114 with satellite data service such as Iridium Short Burst Data (SBD) is used for the data transmission.

Once the data message arrive at the satellite gateway 114, it is forwarded to the Back Office server 118 using an internet protocol such as TCP/IP 116. The message is reconstructed by the back office server 118 and sent to the recipient using the appropriate Internet protocol 120. The recipient device may be a Laptop computer 132, another smartphone 130, a tablet computer 128, a desktop computer 126 or another server 134 or any device connected to the Internet. The back office server 118 can also send the data message to a cellular phone 124 if it is an SMS message 122 using an SMS Gateway.

Since the system is fully bidirectional, a data message such as an email message received at the back office server 118 can be forwarded to the smartphone 104 using the satellite network 110,112,114 and the portable satellite data communication unit 108. The data message is first converted in a format suitable for transfer over the satellite network 110 by the back office. If the portable satellite data communication unit 108 is powered up and as a satellite 110 in view, it will receive the data message and forward it to the smartphone 104 using Bluetooth 106. If the portable satellite data communication unit 108 is unable to receive the data message, the data message will standby at the satellite gateway until the portable satellite data communication unit 108 is ready to receive it.

Figure 2:
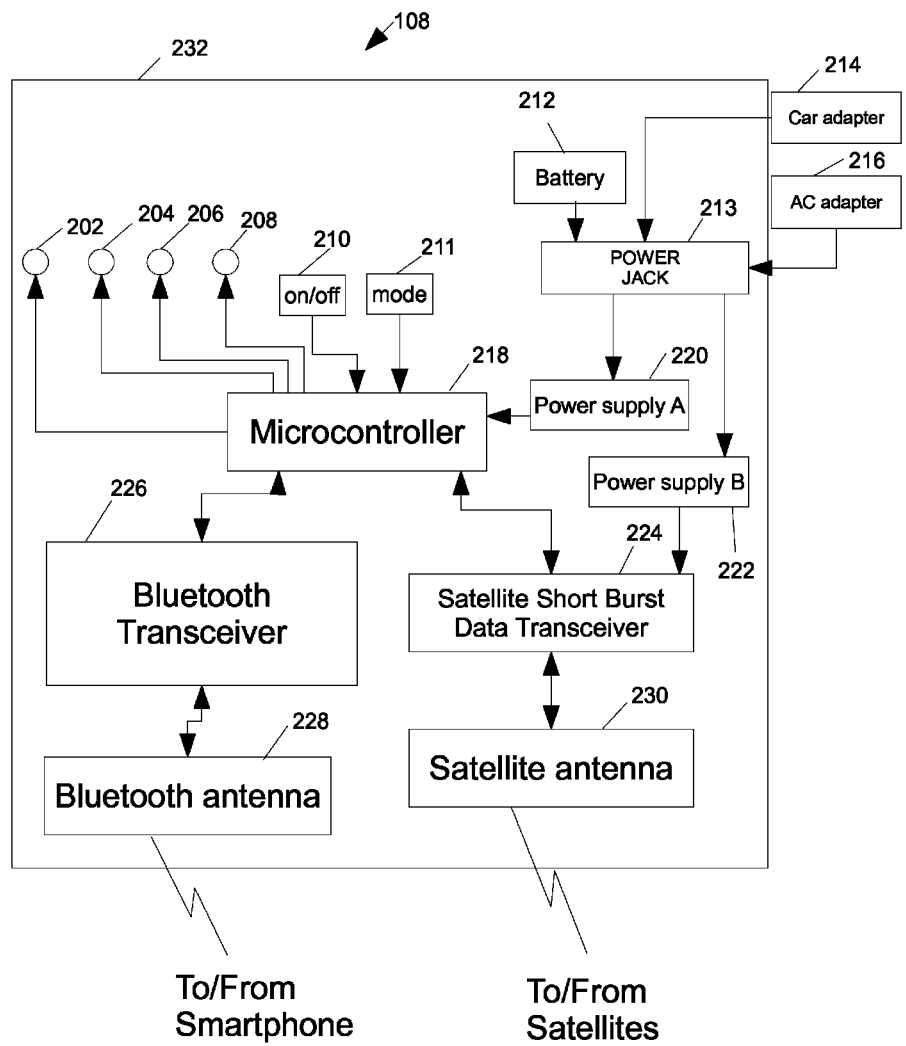
FIG. 2 is a schematic of the electronics employed in the portable satellite data communication unit

FIG. 2 illustrate a schematic of the electronics employed in an exemplary portable satellite data communication unit 108. The portable satellite data communication unit 108 comprises a housing 232 which is preferably made of plastic and of small size to be portable. The housing 108 is preferably waterproof. A plurality of buttons 210-211 are provided on the housing 232 for selection of the operation mode and to switch the unit On and Off. A plurality of light emitting diodes (LEDs) 202,204,206,208 are provided on the housing to monitor the operational activity of the portable satellite data communication unit 108.

The electronic circuitry includes a microcontroller 218, a short range wireless transceiver module such as a Bluetooth transceiver module 226, a satellite short burst data transceiver module 224, a battery 212, a power jack 213, a low current power supply 220, a high current power supply 22, a plurality of light emitting diodes (LED) 202-208 and a plurality of buttons 210. LED 202 turn solid red when power is applied to the portable satellite data communication unit 108. LED 204 turn solid green when a satellite is in view and the signal strength is adequate. LED 206 is yellow and blinks every 2 seconds when a new short burst data message is standing by at the satellite gateway. LED 208 turn solid blue when Bluetooth pairing has been successfully establish between the portable satellite data communication unit 108 and a Bluetooth capable smartphone 104.

In this exemplary embodiments, the Bluetooth antenna 228 and the satellite antenna 230 are located inside the housing. However, the Bluetooth antenna 228 and the satellite antenna 230 can be external to the housing and connected to the Bluetooth Transceiver module 228 and the Satellite Short burst data transceiver module 224 using coaxial cables (not shown). A car power adapter 214 or an AC 100V-240V power adapter 216 can be used instead of the battery 212 for powering the electronic circuitry.

The microcontroller 218 is coupled to and drives a plurality of light emitting diodes (LEDs) 202-208. The microcontroller 218 is coupled to and receives signals from the plurality of buttons 210-211. The microcontroller 218 communicates with the satellite short burst data transceiver 224 using serial communication. The satellite short burst data transceiver 224 may be for example a 9602 Iridium Short Burst data Transceiver. The satellite short burst data transceiver 224 communicates with satellites 110 through the satellite antenna 230. The satellite antenna 230 is of small size and is preferably a patch antenna. The microcontroller 218 communicates with the Bluetooth transceiver 226 using serial communication. The Bluetooth transceiver 226 may be for example the LMX9830 from National Semiconductor.

The low current power supply A 220 provides power to all electronic components but the Satellite Short Burst Transceiver 224. The High current power supply B 220 provides power to the satellite short burst data transceiver 224.

The portable satellite data communication unit 108 is configured to operate as a function of the programming of the microcontroller 218. The microcontroller 218 is programmed to implement various operating mode of the portable satellite data communication unit 108, which respond to mode selection button 211, commands from the smartphone 104 through the Bluetooth Transceiver 226 and activation of the appropriate LEDs 202-208 to notify the user. Operation of the portable satellite data communication unit 108 and the different operating modes that the microcontroller 218 may be programmed to provide are discussed in more detail below. Such programming is generally routine for those skilled in microcontroller and microprocessor programming and specifics regarding the programming will not be discussed in detail herein.

A reduced-to-practice embodiment of the portable satellite data communication unit 108 has 2 main operating modes that can be selected using the mode button 211.

Figure 3:
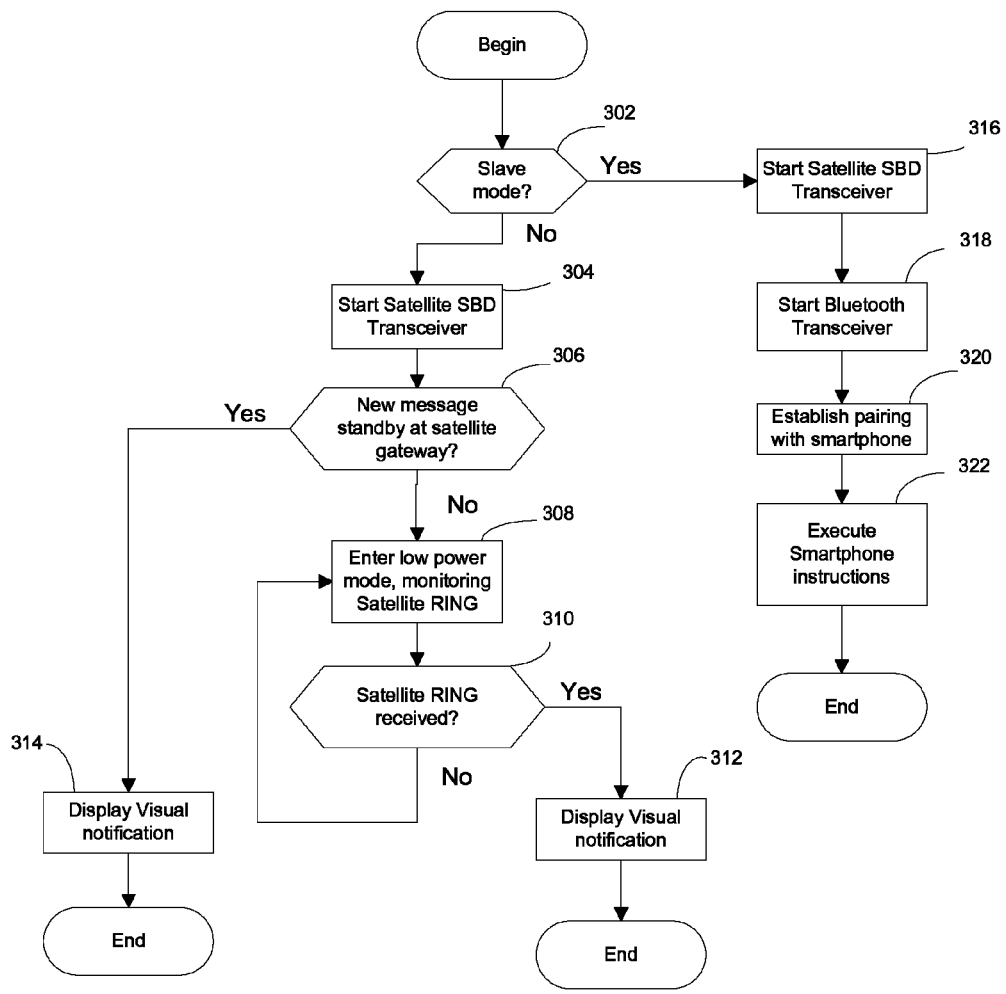
FIG. 3 is a flow diagram illustrating operations of the portable satellite data communication unit according to embodiments of the present invention

FIG. 3 is a flow diagram that illustrate the 2 main operating modes. After powering ON the portable satellite data communication unit 108 using the ON/OFF button 210, the microcontroller 218 check the mode selection button 211. If the selected mode is "Slave" 302, the Satellite Short Burst Data Transceiver 224 is activated 316 and the Bluetooth Transceiver 226 is also activated 318 using the Serial Port Profile (SPP). The Bluetooth Transceiver will then wait for a pairing request from the smartphone 104. Once the request has been received, it will be validated and established 320. The portable satellite data communication unit 108 will then put itself into a slave mode 322 where it will forward smartphone 104 instructions to the Satellite Short Burst Data Transceiver 224. The Satellite Short Burst Data Transceiver 224 which can be for example a 9602 Iridium Short Burst data Transceiver accept industry standard AT commands for establishing communication with the satellite 110, sending short burst data messages, receiving short burst data messages and monitoring satellite signal.

If the selected mode is "Check for new incoming data" 302, the Satellite Short Burst Data Transceiver 224 is activated 304 and instructed using AT commands to register itself on the satellite network and check for new short burst data messages standing by at the satellite gateway 306. If a new short burst data message is standing by at the satellite gateway 114, the Satellite Short Burst Data Transceiver 224 will notify the microcontroller 218 and the LED 206 will start blinking 314. Other embodiments of this invention could also implement additional notification methods.

If there a no new short burst data message standing by at the satellite gateway 114, the portable satellite data communication unit 108 will enter into a low power mode 308 to reduce power consumption. The microcontroller 218 will keep monitoring the Satellite Short Burst Data Transceiver 224 for RING message however 308. RING messages are generated every time a new short burst data message arrives at the satellite gateway. The satellite antenna 230 must keep a direct line of sight with the satellite however for proper operation of this function.

Once a RING message has been received 310, the LED 206 will start blinking 312. Other embodiments of this invention could also implement additional notification methods.

Figure 4:
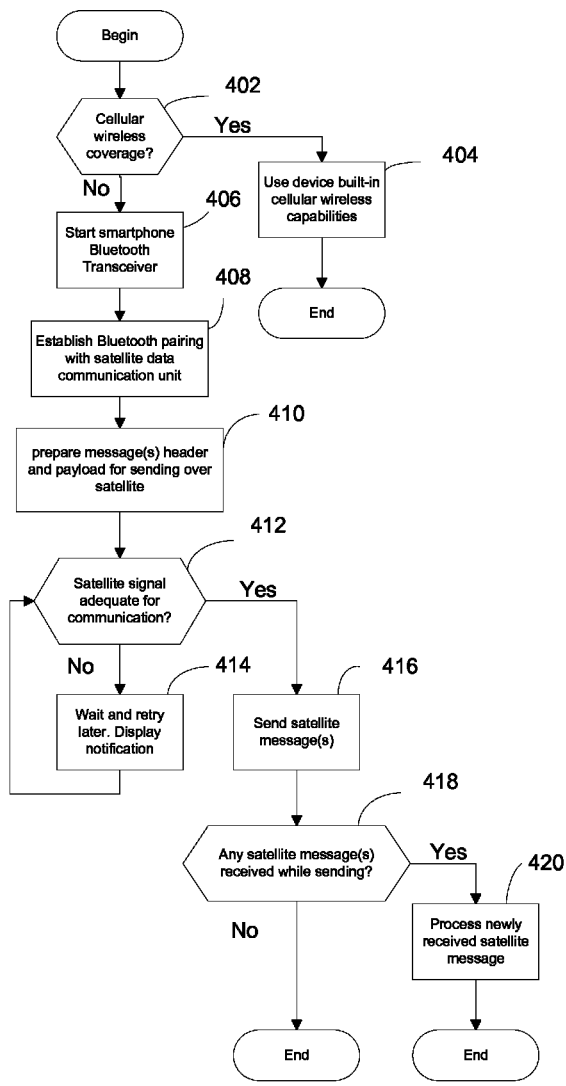
FIG. 4 is a flow diagram illustrating operations of the Smartphone application with the portable satellite data communication unit when sending data

FIG. 4 is a flow diagram that illustrate an exemplary process, which the smartphone 104 may perform for sending data messages over the satellite network. The smartphone 104 will need to be loaded with a special software for enabling data communication with the portable satellite data communication unit 108. Smartphone manufacturers usually provide an Application programming Interface (API) for developing new smartphone applications. Such software programming is generally routine for those skilled in cellular phone and embedded device programming and specifics regarding the programming will not be discussed in detail herein.

The process may begin with an application such as an email client trying to send a data message through the wireless network. If there is cellular coverage and the smartphone is registered on this cellular network, the built-in cellular wireless transceiver will be utilized 404. If there is no cellular wireless coverage 402, the smartphone Bluetooth transceiver 406 will be activated using the Serial Port Profile (SPP). If a portable satellite data communication unit 108 is within the Bluetooth protocol range and it is activated in the "slave" mode 302, the smartphone 104 will try to establish pairing 408 with it. Once the pairing has been completed, the portable satellite data communication unit 108 will behave as slave of the smartphone and will forward all instructions to the satellite short burst data transceiver 224.

Short burst data satellite services such as the Iridium Short Burst Data service have a limited payload in terms of bytes that can be transmitted per satellite short burst data message. Therefore if the data message to be transmitted over the satellite network exceed the maximum payload of a short burst data message, the data message must be segmented and each of the segments must be sent in separate short burst data message. When the separate short burst data message are received, the segments may be combined to reconstruct the original data message. Software programming of functions to segment and reconstruct data messages is generally routine for those skilled in the software engineering art and specifics regarding the programming of these functions will not be discussed in detail herein.

The smartphone 104 software will prepare the short burst data messages 410 and will check if the Satellite short burst data transceiver 224 is ready for sending the data 412. If the satellite signal is inadequate, it will display a notification 414 and retry later for a maximum of 3 attempts. If the signal is adequate, the smartphone 104 will instruct the Satellite short burst data transceiver 224 to send the short burst data messages 416. If an error occur during the sending, it will retry 3 times before displaying a failure notification. If a short burst data message is received from the satellite gateway 114 while transmitting the short burst data message 418, it will be processed 420 and stored in the smartphone 104 memory.

Figure 5:
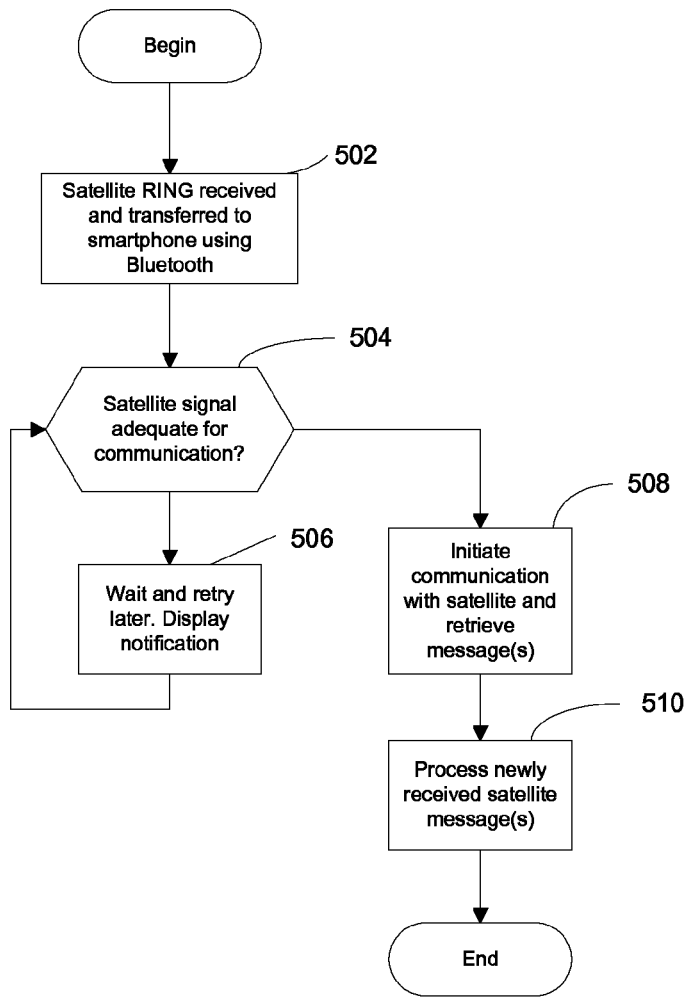
FIG. 5 is a flow diagram illustrating operations of the Smartphone application with the portable satellite data communication unit when receiving data

FIG. 5 is a flow diagram that illustrate an exemplary process, which the smartphone 104 may perform for receiving data messages over the satellite network. Once the Bluetooth pairing has been completed between the smartphone 104 and the portable satellite data communication unit 108 as in the steps 402, 406 and 408 of FIG. 4, the smartphone 104 will listen for RING messages 502 produced by the Satellite short burst data transceiver 224. RING messages are generated by Short Burst Data Transceiver like the 9602 Iridium Short Burst Data Transceiver to indicate that a new short burst data message has arrived at the satellite gateway 114. The smartphone 104 will then check if the Satellite short burst data transceiver 224 is ready for communication 504. If the satellite signal is inadequate, it will display a notification 506 and retry later for a maximum of 3 attempts. If the signal is adequate, the smartphone 104 will instruct the Satellite short burst data transceiver 224 to start retrieving short burst data messages 508. Once the short burst data messages have been received successfully, they are processed and the data message is reconstructed 510.

Figure 6:
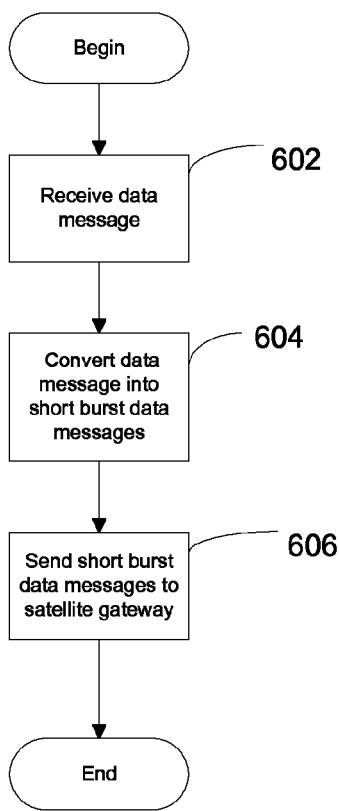
FIG. 6 is a flow diagram that illustrate an exemplary process, which the processing center or back office may perform for sending a data message from an external computing device to the satellite gateway.

FIG. 6 is a flow diagram that illustrate an exemplary process, which the processing center or back office 118 may perform for sending a data message from an external computing device like an internet server 134, a computer 126, a tablet computer 128, a smartphone 130 or a cell phone to the satellite gateway 114.

The data message which may be for example an email message is received at the back office 602. If the data message is too large to be sent in one short burst data message, it is segmented in multiple short burst data messages 604 and the resulting messages are sent to the satellite gateway 606.

Figure 7:
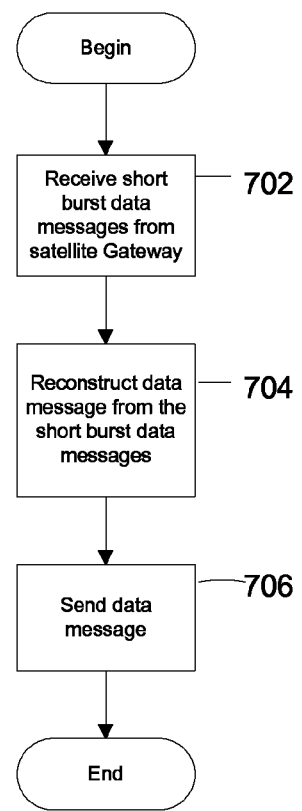
FIG. 7 is a flow diagram that illustrate an exemplary process, which the processing center or back office may perform when receiving short burst data messages from the satellite gateway.

FIG. 7 is a flow diagram that illustrate an exemplary process, which the back office 118 may perform when receiving short burst data messages from the satellite gateway 114.

The short burst data messages are received at the satellite gateway 702 and the data message is reconstructed from the short burst data messages 704. If the short burst data message contains all the information necessary to reconstruct the data message then aggregation of multiple short burst data messages is not necessary. Once the data message has been fully reconstructed, it is sent to its destination 706.

Figure 8:
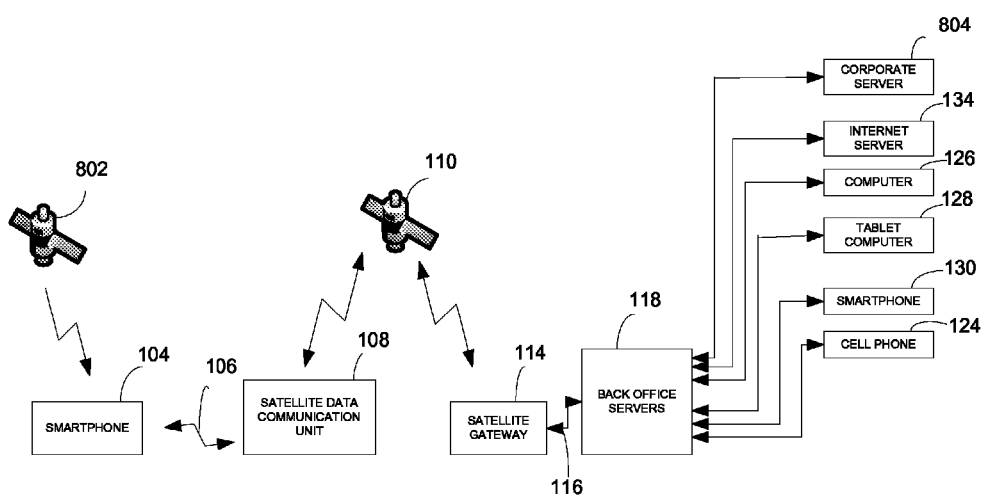
FIG. 8 illustrates an exemplary satellite data transfer using a cellular smartphone and the portable satellite data communication unit.

FIG. 8 illustrates an exemplary satellite data transfer using a cellular smartphone and the portable satellite data communication unit.

For example, a user in a remote area without cellular coverage would like to transmit its current GPS coordinate for display on a web service like Google Map. A smartphone equipped with a GPS receiver triangulate the current position using GPS satellites 602. The location data is processed by the smartphone 104 and the data is embedded into a short burst data message. The short burst data message is sent over Bluetooth 106 to the portable satellite data communication unit 108. The portable satellite data communication unit 108 send the short burst data message to the satellite 110 and the satellite forward it to the satellite gateway 114. The satellite gateway forward the short burst data message to the back office server 118 using TCP/IP socket communication 116. The back office server 118 extract the location information from the short burst data message and send it to its destination which may be a corporate server 604 or an internet server 134.

Since the system is bidirectional, a data message such as an email can be sent to the smartphone 104. The data message arrive at the back office 118 and it is segmented if necessary into multiple short burst data messages. The short burst data messages are sent to the satellite gateway 114 using TCP/IP socket communication 116. The satellite gateway 114 send a RING notice to the satellite data communication unit 108. The smartphone 104 is notified of the RING notice and request the portable satellite data communication unit 108 to recover the short burst data messages. The short burst data messages are received at the smartphone 104 using the Bluetooth link 106. The smartphone 104 reconstruct the data message from the short burst data messages.

Bluetooth is used throughout the description of this exemplary embodiment but other short distance wireless protocol like Wireless USB or WIFI could also be used.

CONCLUSION

Systems, apparatus and methods for sending and receiving data messages with a cellular only smartphone in a remote area without cellular wireless coverage have been disclosed. Although specific terms are employed, they are used in a generic and descriptive sense only and not for purpose of limitation. It is to be understood that the above-described embodiments are merely illustrative of some of the many specific embodiments that represent applications of the principles discussed above. Clearly, numerous other arrangements can be readily devised by those skilled in the art without departing from the scope of the invention.

What is claimed is:

1. A portable satellite data communication apparatus comprising:
   a housing;
   a satellite data transceiver for sending and receiving short burst data to, from a remote location via one or more communication satellites;
   a short range wireless transceiver for sending and receiving data messages to, from a short range wireless computing device;
   a plurality of buttons for turning the apparatus on and off and to select one of a predetermined number of operational modes;
   a microcontroller coupled to said satellite data transceiver for monitoring the status of the satellite signal and the arrival of one or more new short burst data messages at the satellite gateway;
   a plurality of light emitting diodes (LEDs) for indicating the operational status of the apparatus;
   a compact satellite antenna coupled to said satellite data transceiver; and
   a short range wireless antenna coupled to said short range wireless transceiver.

2. The apparatus recited in claim 1 wherein said compact satellite antenna is external to the housing and coupled to said satellite data transceiver using a coaxial cable.

3. The apparatus recited in claim 1 wherein said satellite data transceiver is a satellite short burst data transceiver.

4. The apparatus recited in claim 1 wherein said short range wireless transceiver is a Bluetooth wireless transceiver.

5. The apparatus recited in claim 1 wherein said short range wireless computing device is a smartphone.

6. The apparatus recited in claim 1 wherein said short range wireless computing device is a short range wireless capable computer.

7. The apparatus recited in claim 1 wherein said satellite data transceiver is a satellite short burst data transceiver and said short range wireless transceiver is a Bluetooth wireless transceiver and said short range wireless computing device is a smartphone.

8. The apparatus recited in claim 7 wherein said compact satellite antenna is external to the housing and coupled to said short burst satellite data transceiver using a coaxial cable.

9. The apparatus recited in claim 7 where said smartphone is a short range wireless capable computer.

10. A portable satellite data communication system comprising:
    a satellite gateway for transmitting and receiving short burst data message to, from satellites and to, from a remote processing center;
    one or more communication satellites for transmitting one or more data messages;
    a portable satellite data communication device which includes (1) a satellite data transceiver for sending and receiving short bust data message to, from a remote location via said communication satellites, (2) a short range wireless transceiver for sending and receiving data messages to, from a short range wireless computing device, (3) a plurality of selectable elements for selecting a predetermined number of operational modes, (4) a microcontroller coupled to said satellite data transceiver that is programmed to operate according to the operational mode selected, to monitor the status of the satellite signal and the arrival of one or more new short burst data message at said satellite gateway;

a wireless computing device equipped with a short range wireless transceiver running the appropriate software for sending and receiving data message using as a slave said portable satellite data communication device; and a remotely located processing center accomplishing the tasks of
   a. receiving, processing and reconstructing short burst data messages coming from one or more said wireless computing device and forwarding a corresponding data messages to one or more designated locations; and
   b. processing incoming data messages and converting those into short burst data messages for forwarding to said satellite gateway for delivery to said wireless computing device.

11. The system recited in claim 10 where said satellite data transceiver is a short burst satellite data transceiver and said short range wireless transceiver is a Bluetooth short range wireless transceiver and said wireless computing device is a smartphone.

12. The system recited in claim 11 wherein said remotely located processing center forwards an email message to, from said smartphone.

13. The system recited in claim 11 wherein said remotely located processing center forwards a short message service (SMS) message from said smartphone and to, from one or more cellular phones.

14. The system recited in claim 11 wherein said remotely located processing center forwards a GPS coordinate location from said smartphone to multiple remote location.

15. A portable satellite data communication method for sending and receiving data messages using a short range wireless computing device in a remote location, which comprise:

providing a satellite data transceiver for sending and receiving short burst data messages to, from said remote location via one or more communication satellites;

providing a short range wireless transceiver for sending and receiving data messages to, from said short range wireless computing device;

converting data messages into one or more short burst data messages for sending over said communication satellite; and converting one or more short burst data messages received by said satellite data transceiver from said communication satellites into data messages.

16. The method recited in claim 15 where said satellite data transceiver is a short burst satellite data transceiver and said short range wireless transceiver is a Bluetooth short range wireless transceiver and said wireless computing device is a smartphone.

17. The method recited in claim 15 wherein data message is an SMS message.

18. The method recited in claim 15 wherein data message is an email message.

19. The method recited in claim 16 wherein data message is an SMS message.

20. The method recited in claim 16 wherein data message is an email message.

* * * * *